Feb. 3, 1931.  V. WISNIEWSKI  1,791,079
PROPELLING DEVICE FOR AIRCRAFT
Filed Feb. 1, 1929  3 Sheets-Sheet 1
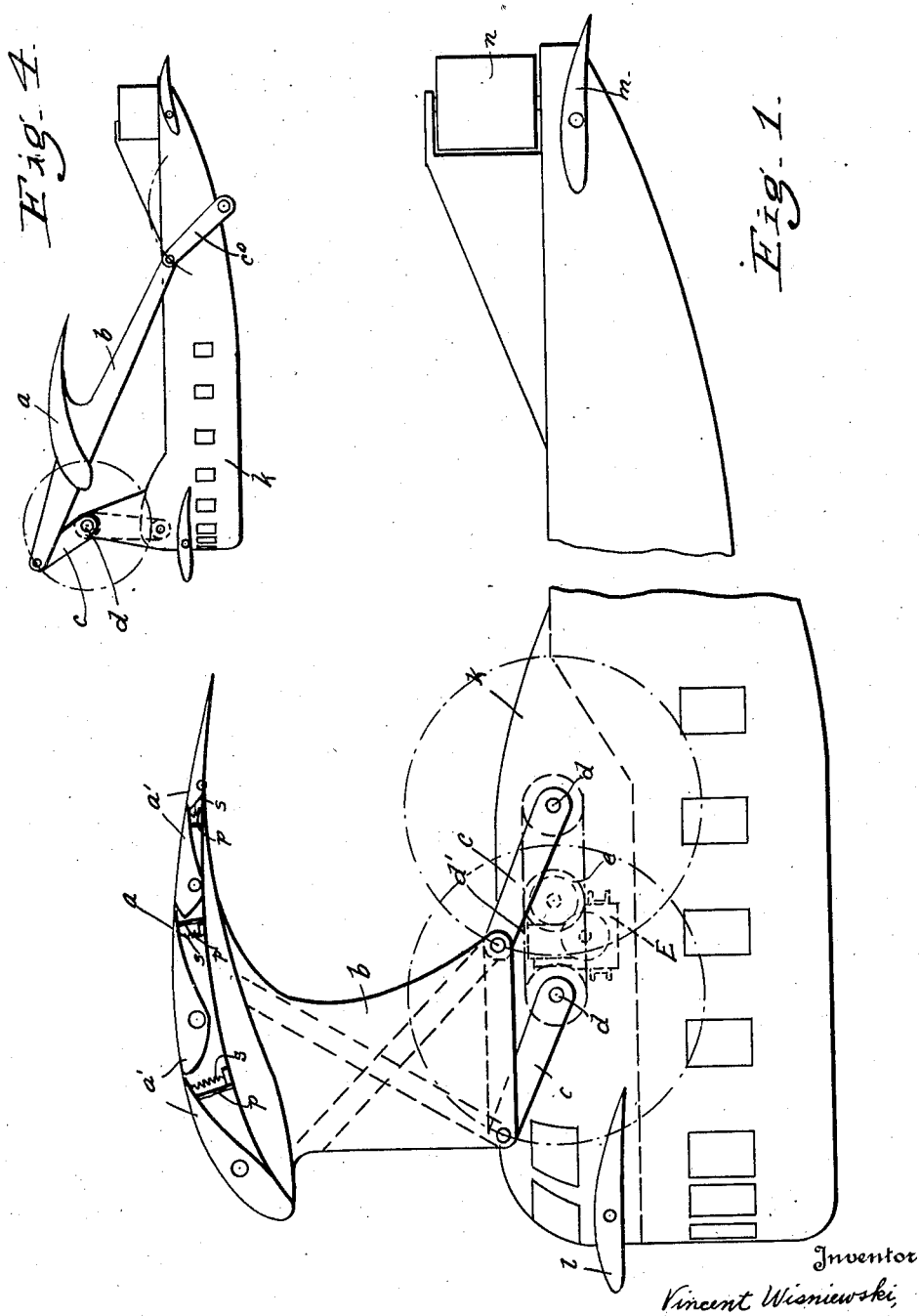
Inventor
Vincent Wisniewski
By
Stuteard + Mason,
Attorneys.

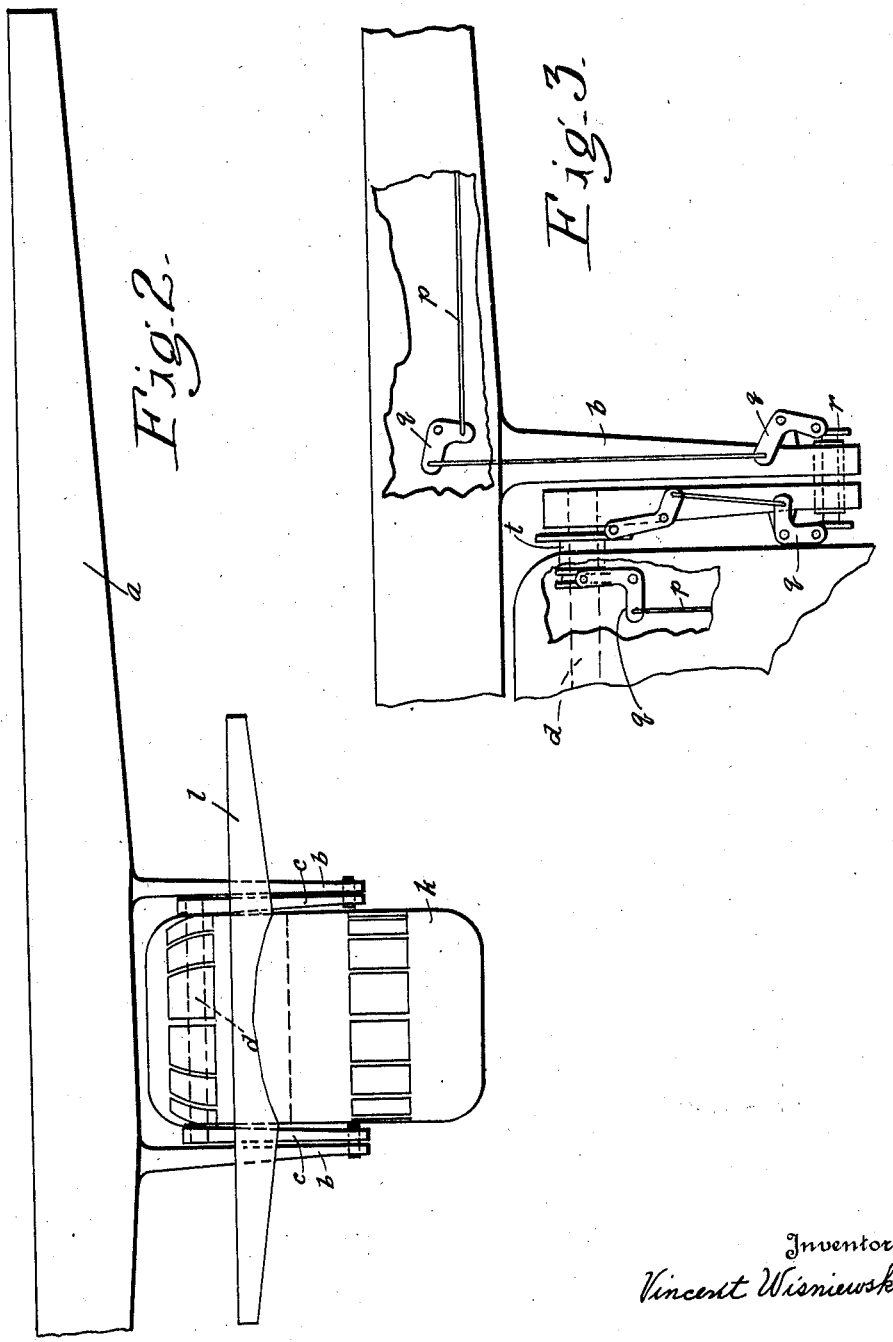

Feb. 3, 1931.  V. WISNIEWSKI  1,791,079
PROPELLING DEVICE FOR AIRCRAFT
Filed Feb. 1, 1929   3 Sheets-Sheet 3
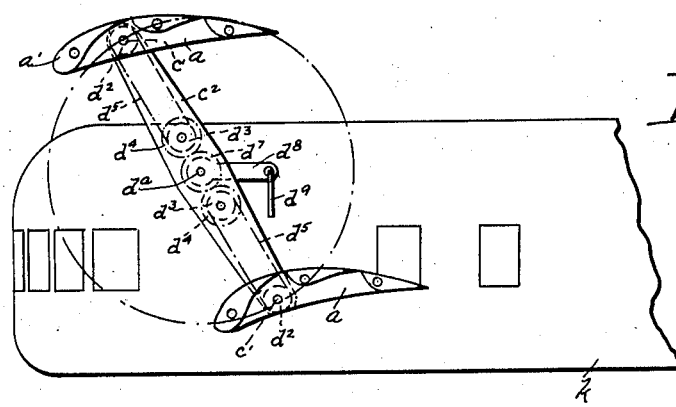
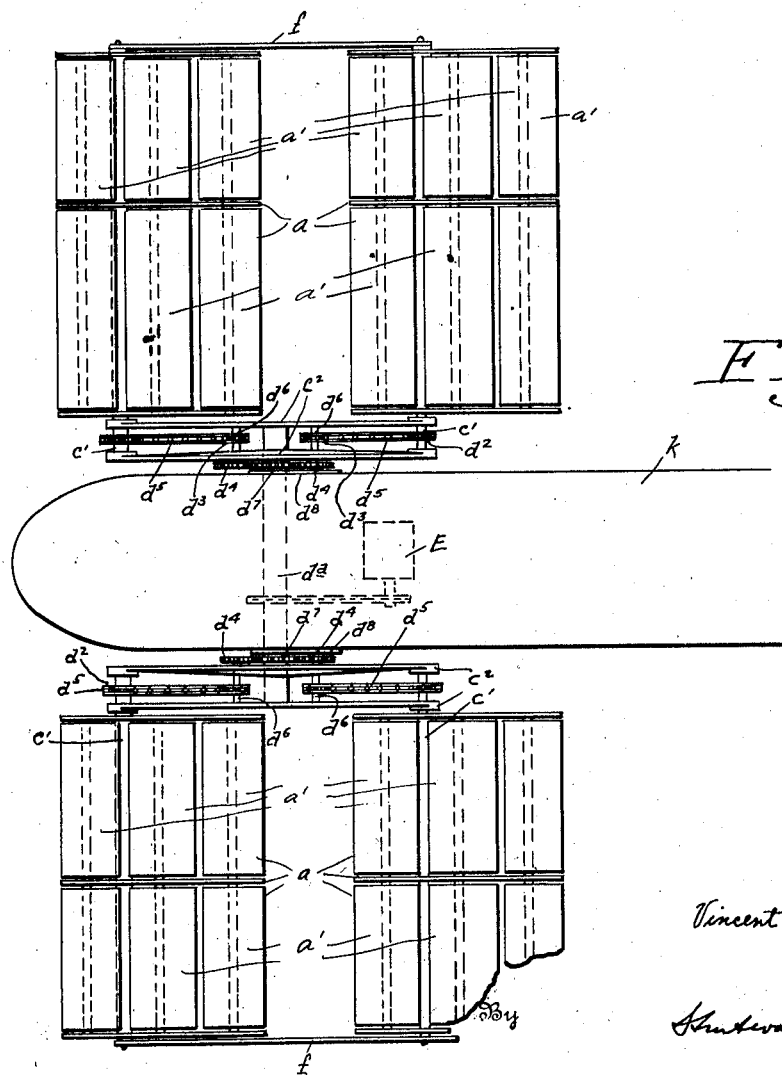

Patented Feb. 3, 1931

1,791,079

UNITED STATES PATENT OFFICE

VINCENT WISNIEWSKI, OF BERLIN, GERMANY

PROPELLING DEVICE FOR AIRCRAFT

Application filed February 1, 1929, Serial No. 336,793, and in Germany January 28, 1928.

The invention relates to a propelling device for aircraft, in which surfaces designed for greatest flying speed, for greatest lifting and forward drive as well as for the greatest possible transverse stability of the machine and serving simultaneously as supporting, driving and steering planes, are given a circular motion which gives rise to a flapping action. With this object, the self supporting surfaces are journaled transversely of the machine in members connecting pairs of cranks, in such manner that the surfaces or parts thereof are adjustable. By this manner of mounting, the surfaces remain in an approximately horizontal position during the circular motion. When the surfaces are given a circular motion while retaining their horizontal position, a beating action against the air occurs on the downward motion, which with appropriate formation of the surfaces meets with an extremely high air resistance, by which an appreciable amount of useful work will be obtained.

In a preferred form of the invention, the freely mounted wing surfaces are journaled in special supporting members connecting pairs of double armed cranks on either side of the body, in such manner that the resulting force is transferred to a short crankshaft, whereby the requisite speed of rotation can be obtained and the crankshaft takes up the sideways pressure of the crank arms under load.

Illustrative forms of construction of the invention are set forth in the accompanying drawings, in which:—

Figs. 1 and 2 are respectively side and front elevations of one embodiment of the invention.

Fig. 3 is a detail view in fragmentary front elevation, on a somewhat larger scale.

Fig. 4 is a side elevation on a reduced scale of a modified form of construction.

Figs. 5 and 6 are respectively fragmentary side and top views of another modified form of practicing the invention.

In the first embodiment of Figs. 1 and 2, the body or fuselage $k$ of the airship is illustrated as provided with a front stabilizing surface $l$ and rear stabilizing or elevator and rudder surfaces $m$ and $n$. Two parallel transverse shafts $d$ near the front of the body are driven by a chain connection $d'$ from a sprocket $e$ driven by the engine E, whereby the shafts $d$ are set in simultaneous rotation in the same direction and at the same rate of speed. Each of these shafts $d$ carries a pair of crank arms $c$ at equal radii, one of these arms on each shaft being located at either side of the body $k$ (Fig. 2). The free ends of the crank arms $c$ are joined by a connecting member $b$ which carries the suporting surface $a$.

As the engine drives the shafts $d$ in a counterclockwise direction in Fig. 1, the surface $a$ is caused to move so that each point on it performs substantially a circular movement with respect to the body $k$. The surfaces are so constructed that they meet with a smaller air resistance on the upward motion; this can be obtained by suitable means, such as, for example, flaps.

Further the surfaces are so formed that they create lifting and forward drive by their motion, and the transverse stability of the machine ensured by giving them the greatest possible span.

The surface $a$ can be adjustably journaled in the supporting members $b$ connecting the cranks $c$; an automatic adjustment is obtained by rotatably journaling the surface at $d$, the beating of the free end being limited by means of springs. It can also be adjusted by means of levers and ties which pass to the surface $a$ through the centre of the crank bearing. As shown in Figs. 1 and 3, it is preferred to provide each of the flaps $a'$ with a spring $s$ which permits the flaps to move relative to one another and to the supporting member $b$, being limited in this movement by the operation of a tie cable assembly $p$ which by means of cranks $q$ and the pins $r$ and collars $t$, permit the control of the cable system $p$ through the center of the crank bearings. Further the position of the driving device relative to the body of the machine may be adjusted, whereby the position of the surfaces will also be altered.

In Fig. 4, a rudder-or oar-like motion is obtained by making the connecting members $b$ of appropriate lengths, and driving only the forward pair of cranks $c$ by means of the engine, while the other ends of the connecting members $b$ are pivoted to longer crank arms $c^0$ or are otherwise positively guided.

In the form of construction illustrated in Figs. 5 and 6, the two driving surfaces $a$ are journaled in a double pair of cranks on either side of the body of the machine. The fuselage $k$ has a small horizontal shaft $d^a$ transversely thereof and supporting the pairs of crank arms $c^2$ at either side of the body. In the free ends of each pair of these crank arms $c^2$ are journaled the horizontal transverse shafts $c'$; upon each of the four shafts $c'$ is mounted a supporting surface comprising flaps $a'$ as before. In order that the surfaces may maintain an approximately horizontal position, they must be held in place by means of chains or other suitable means. The shafts $c'$ are rotatable in bearings at the ends of the crank members $c^2$, and are each provided with a sprocket $d^2$ which is driven by a chain $d^5$ passing over a sprocket $d^3$ located on a respective stub shaft $d^6$ which carries a gear $d^4$ meshing with a gear $d^7$ loosely mounted on the shaft $d^a$. The gear $d^7$ has fixed thereto a projecting crank arm $d^8$ by which the position of this gear may be varied, by the operation of a cable $d^9$ (Fig. 5).

With this form of construction, as the shaft $d^a$ is set in counterclockwise rotation in Fig. 5 by means of an engine E (Fig. 6), each of the supporting surfaces $a$ is carried in a circular path with respect to the body $k$ by means of the crank arms $c^2$. At the same time, the gears $d^4$ travel around the gear $d^7$ and are thus rotated by a single revolution for each revolution of the shaft $d$. The sprockets $d^3$, $d^2$ and the chains $d^5$ similarly produce a single revolution of the shafts $c'$ during each revolution of the shaft $d^a$, so that supporting surfaces $a$ are maintained at the same angle with respect to the body $k$ during the rotation of the shaft $d^a$. However, by movement of the crank arm $d^8$, the aviator can adjust and control the position of the supporting surfaces $a$ with respect to the body $k$ according to the requirements of flight. The flaps $a'$ are preferably controlled in the manner shown in Fig. 3.

Claims:

1. In an airship, a body, a transverse main shaft extending laterally beyond the body, crank arms fixed on said main shaft on the extending portions thereof and revoluble therewith, a member pivoted at the end of each crank arm, supporting means secured to said members and comprising flaps movable to permit the passage of air therethrough during the upward movement of said means with respect to said body, and movable to close relative to one another to engage the air during downward movement with respect to the body, and means operating through the axis of the revoluble main shaft to control said flaps.

2. In an airship, a body, a transverse main shaft extending laterally beyond the body, double crank arms on said main shaft at the extending portions thereof, transverse wing shafts journaled at the ends of said crank arms, supporting surfaces fixed on said wing shafts, transverse sprocket shafts journaled on said crank arms adjacent said main shaft, sprockets on said wing shafts and sprocket shafts, chains connecting said sprockets, gears fixed on said sprocket shafts, and gears loosely mounted on the ends of said main shaft and in mesh with said sprocket shaft gears, whereby the rotation of said main shaft will cause the surfaces to travel in a circular path while maintaining their angle with respect to the body, and means to move said loose gears by a partial rotation to change the angle of said surfaces with respect to the body.

In testimony whereof I have signed my name to this specification.

VINCENT WISNIEWSKI.